US012683286B2

(12) United States Patent
Cho et al.

(10) Patent No.: US 12,683,286 B2
(45) Date of Patent: Jul. 14, 2026

(54) WIRELESS SIGNAL RECEIVER DEVICE

(71) Applicant: ELECTRONICS AND TELECOMMUNICATIONS RESEARCH INSTITUTE, Daejeon (KR)

(72) Inventors: In Kui Cho, Daejeon (KR); Jang Yeol Kim, Daejeon (KR); Jung Hoon Oh, Daejeon (KR); Hyun Joon Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 397 days.

(21) Appl. No.: 18/377,009

(22) Filed: Oct. 5, 2023

(65) Prior Publication Data

US 2024/0120658 A1 Apr. 11, 2024

(30) Foreign Application Priority Data

Oct. 6, 2022 (KR) ........................ 10-2022-0127708
Sep. 12, 2023 (KR) ........................ 10-2023-0121169

(51) Int. Cl.
*H01Q 15/00* (2006.01)
*H01Q 7/00* (2006.01)

(52) U.S. Cl.
CPC ........... *H01Q 15/0013* (2013.01); *H01Q 7/00* (2013.01); *H01Q 15/006* (2013.01)

(58) Field of Classification Search
CPC .... H01Q 15/0013; H01Q 7/00; H01Q 15/006; H01Q 21/0006; H04B 1/126
See application file for complete search history.

(56) References Cited

U.S. PATENT DOCUMENTS 5,630,835 A 5/1997 Brownlee
10,686,337 B2 6/2020 Roy et al.
11,143,721 B2 10/2021 Gerginov
2008/0157862 A1 * 7/2008 Hatanaka .............. H04B 1/123 327/551

(Continued)

FOREIGN PATENT DOCUMENTS

JP S60-155236 U 10/1985
JP 2007-199888 A 8/2007

(Continued)

*Primary Examiner* — Angelica Perez
(74) *Attorney, Agent, or Firm* — LRK PATENT LAW FIRM

(57) ABSTRACT

An exemplary embodiment provides a signal receiver device capable of detecting a radio communication signal with a high signal-to-noise ratio while internally canceling an environmental noise. A signal receiver device according to an exemplary embodiment includes a first signal detection element; and a second signal detection element electrically connected to the first signal detection element and provided with a blocking member for attenuating a communication signal among received RF signals. The signal receiver device is configured to output a difference between a first detection signal detected by the first signal detection element and a second detection signal detected by the second signal detection element as a detected receive signal.

20 Claims, 16 Drawing Sheets

(56) References Cited

U.S. PATENT DOCUMENTS

| | | | | |
|---|---|---|---|---|
| 2013/0249755 | A1* | 9/2013 | Sanchez | H01Q 15/244 343/756 |
| 2018/0145404 | A1* | 5/2018 | Lavedas | H04B 5/263 |
| 2021/0211149 | A1 | 7/2021 | Singh et al. | |
| 2022/0069855 | A1 | 3/2022 | Abdelmonem et al. | |
| 2024/0137057 | A1* | 4/2024 | Takayama | H04B 1/10 |

FOREIGN PATENT DOCUMENTS

| | | | | |
|---|---|---|---|---|
| JP | 5104953 | B2 * | 12/2012 | H04B 1/126 |
| JP | 2021-2777 | A | 1/2021 | |
| KR | 10-2009-0116348 | A | 11/2009 | |
| KR | 10-2010-0056446 | A | 5/2010 | |
| KR | 10-2021-0044687 | A | 4/2021 | |
| WO | 2010/021096 | A1 | 2/2010 | |
| WO | 2016/121375 | A1 | 8/2016 | |

* cited by examiner

WIRELESS SIGNAL RECEIVER DEVICE

CROSS-REFERENCE TO RELATED APPLICATION

The present application claims convention priorities under 35 U.S.C. § 119(a) based on Korean Patent Applications No 10-2022-0127708 filed on Oct. 6, 2022, and No. 10-2023-0121169 filed on Sep. 12, 2023, the entire contents of which are incorporated herein in their entireties by reference.

BACKGROUND

1. Technical Field

The present disclosure relates to a communication device and, more particularly, to an antenna device for receiving a signal with a high signal-to-noise ratio and a wireless signal receiver employing the antenna.

2. Related Arts

In a radio communication antenna, a signal-to-noise ratio is always an important parameter. Signal interference or environmental noise degrades quality of communications, but it is not easy to deal with noise signals caused by the interference or the environmental noise. In consideration of this issue, a transmitter and a receiver in a radio communications system are deployed such that communications take place in a limited range and environment. Also, in the receiver, a filter for suppressing interferences of surrounding signals is designed to have excellent skirt characteristics in addition to required passband characteristics. However, limiting the transmission ranges and the use of filters having excellent characteristics require lots of costs for constructing and operating the system.

On the other hand, in some biomedical diagnostic devices for an electroencephalography (EEG), a magnetoencephalography (MEG), a magnetocardiography (MCG), a gradiometer is used to remove the environmental noise and detect a very weak signal. The gradiometer have two identical detection elements disposed in opposite directions, so that two identical signals detected by the detection elements are cancelled. In case where an communication signal has a propagation characteristic of rapidly attenuating in space as can be seen in an EEG signal, a MEG signal, and a MCG signal, the environmental noise is equally coupled to the two detection elements and most of the detected signals are cancelled after a combination while the communication signal that rapidly attenuates in space is coupled to the detection elements with different intensities and a combined signal remain after a cancellation. Accordingly, the gradiometer can detect a signal of with a very weak intensity and mixed with the environmental noise by deriving a spatial difference of signals detected simultaneously. However, in the case of a radio communication signal which is a traveling wave, a differential method does not work because there is little signal attenuation and difference between two signals detected by respective detecting elements that may be disposed close to each other to detect a gradient of the signals. As a result, there is no antenna that detects a signal by the differential method in the radio communications.

SUMMARY

Provided is a signal receiver device capable of detecting a radio communication signal with a high signal-to-noise ratio while internally canceling an environmental noise in a manner similar to a gradiometer.

Provided is a signal receiving method for detecting a radio communication signal with a high signal-to-noise ratio by internally canceling an environmental noise.

According to an aspect of an exemplary embodiment, a signal receiver device includes: a first signal detection element; and a second signal detection element electrically connected to the first signal detection element and provided with a blocking member for attenuating a communication signal among received RF signals. The signal receiver device is configured to output a difference between a first detection signal detected by the first signal detection element and a second detection signal detected by the second signal detection element as a detected receive signal.

The first signal detection element and the second signal detection element may be connected in series such that the first detection signal and the second detection signal are cancelled at least partially.

The first signal detection element and the second signal detection element may be connected such that a direction of current according to a reception of the RF signal in the first signal detection element is opposite to the direction of current according to the reception of the RF signal in the second signal detection element.

The first signal detection element and the second signal detection element may include loop antennas wound in opposite directions.

The first signal detection element may include a first loop antenna wound in a first direction. The second signal detection element may include a second antenna wound in a second direction opposite to the first direction.

The first loop antenna and the second loop antenna may be disposed such that a plane formed by the first loop antenna and a plane formed by the second loop antenna do not coincide but are parallel to each other.

The first loop antenna and the second loop antenna may be disposed such that a central axis of the first loop antenna coincides with a central axis of the second loop antenna, A second end of the first loop antenna where the winding of the first loop antenna ends and a first end of the second loop antenna where the winding of the second loop antenna starts may be electrically connected to each other.

The first loop antenna and the second loop antenna may be disposed on a same plane.

The signal receiver device may further include: a first connecting portion connecting a second end of the first signal detection portion where the first loop antenna ends and a first end of the second signal detection portion where the second loop antenna starts; and a second connecting portion connecting a second end of the second signal detection portion where the second loop antenna ends to an end of a feeding line. The first connecting portion and the second connecting portion may be arranged to be twisted and cross each other.

The blocking member of the second signal detection element may be a frequency selective surface (FSS) suitable for attenuating a signal of a same frequency as a frequency of the communication signal. Such a configuration may be particularly useful for eliminating or suppressing a noise caused by an adjacent channel interference.

The blocking member of the second signal detection element may be a polarization selective surface (PSS) suitable for attenuating a signal having a same polarization as a polarization of the communication signal.

The blocking member of the second signal detection element may include a coating layer formed on a surface of the second signal detection element.

The blocking member of the second signal detection element may be provided on a surface of a frame accommodating the second signal detection element.

The signal receiver device may further include an amplifier for amplifying a difference between detection signals of the first signal detection element and the second signal detection element.

According to another aspect of an exemplary embodiment, a signal receiver device includes: an antenna for detecting an RF signal and outputting a detected receive signal; and a signal processing circuit amplifying the detected receive signal, and demodulating and decoding an amplified signal to reconstruct data included in the detected receive signal. The antenna includes: a first signal detection element; and a second signal detection element electrically connected to the first signal detection element and provided with a blocking member for attenuating a communication signal included in the RF signal. The signal receiver device is configured to output a difference between a first detection signal detected by the first signal detection element and a second detection signal detected by the second signal detection element as the detected receive signal.

The first signal detection element and the second signal detection element may be connected in series such that the first detection signal and the second detection signal are cancelled at least partially.

The first signal detection element and the second signal detection element are connected such that a direction of current according to a reception of the RF signal in the first signal detection element is opposite to the direction of current according to the reception of the RF signal in the second signal detection element.

According to an aspect of an exemplary embodiment, a wireless signal receiving method includes: detecting an RF signal comprising a communication signal and a noise signal by a first detection element to generate a first detection signal; intentionally attenuating only the communication signal among the RF signal based on an attribute of the communication signal and detecting an intentionally and selectively attenuated RF signal by a second detection element to generate a second detection signal; and combining the first and second detection signals such that noise signal components included in the detection results are canceled to generate a receive signal including communication signal component.

The first signal detection element and the second signal detection element may have a same size and gain, but have a phase difference of 180 degrees from each other. The first signal detection element and the second signal detection element may be connected in series.

According to exemplary embodiments, a communication signal can be detected with a high signal-to-noise ratio by cancelling the environmental noise internally within a physical antenna having two elements to reduce the environmental noise while maintaining the communication signal. The communication signal component incident on one of two detection elements is forced to be significantly attenuated, so that the cancellation, according to the differential method, of the signals received by the two detection elements is effective only for the noise component while being ineffective for the communication signal component. As a result, the noise signal component may be removed significantly while communication signal component is maintained, and the signal-to-noise ratio is significantly improved.

The present disclosure enables to extend a transmission range of a transmit signal or improve signal reception characteristics or a signal quality in the signal receiver device even when there are lots of noises including the environmental noise and the interference of other communication signals and even a minimum sensitivity of the receiver cannot be exploited.

BRIEF DESCRIPTION OF THE DRAWINGS

In order that the disclosure may be well understood, there will now be described various forms thereof, given by way of example, reference being made to the accompanying drawings, in which.

Figure 1:
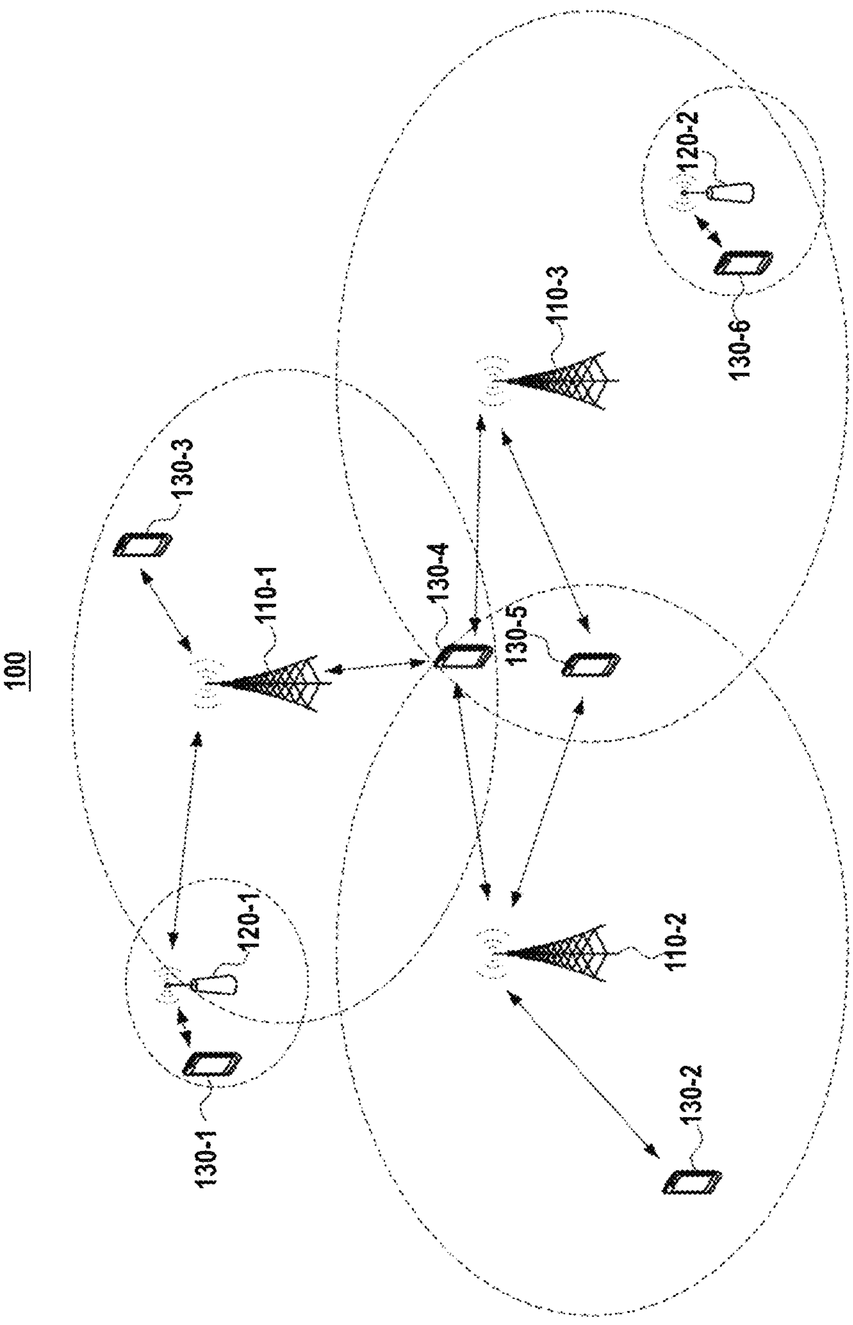
FIG. 1 is a schematic diagram of a communication system according to an exemplary embodiment of the present disclosure.

The drawings described herein are for illustration purposes only and are not intended to limit the scope of the present disclosure in any way.

DETAILED DESCRIPTION

For a clearer understanding of the features and advantages of the present disclosure, exemplary embodiments of the present disclosure will be described in detail with reference to the accompanied drawings. However, it should be understood that the present disclosure is not limited to particular embodiments disclosed herein but includes all modifications, equivalents, and alternatives falling within the spirit and scope of the present disclosure. In the drawings, similar or corresponding components may be designated by the same or similar reference numerals.

The terminologies including ordinals such as "first" and "second" designated for explaining various components in this specification are used to discriminate a component from the other ones but are not intended to be limiting to a specific component. For example, a second component may be referred to as a first component and, similarly, a first component may also be referred to as a second component without departing from the scope of the present disclosure. As used herein, the term "and/or" may include a presence of one or more of the associated listed items and any and all combinations of the listed items.

In the description of exemplary embodiments of the present disclosure, "at least one of A and B" may mean "at least one of A or B" or "at least one of combinations of one or more of A and B". In addition, in the description of exemplary embodiments of the present disclosure, "one or more of A and B" may mean "one or more of A or B" or "one or more of combinations of one or more of A and B".

When a component is referred to as being "connected" or "coupled" to another component, the component may be directly connected or coupled logically or physically to the other component or indirectly through an object therebetween. Contrarily, when a component is referred to as being "directly connected" or "directly coupled" to another component, it is to be understood that there is no intervening object between the components. Other words used to describe the relationship between elements should be interpreted in a similar fashion.

The terminologies are used herein for the purpose of describing particular exemplary embodiments only and are not intended to limit the present disclosure. The singular forms include plural referents as well unless the context clearly dictates otherwise. Also, the expressions "comprises," "includes," "constructed," "configured" are used to refer a presence of a combination of stated features, numbers, processing steps, operations, elements, or components, but are not intended to preclude a presence or addition of another feature, number, processing step, operation, element, or component.

Unless defined otherwise, all terms used herein, including technical or scientific terms, have the same meaning as commonly understood by those of ordinary skill in the art to which the present disclosure pertains. Terms such as those defined in a commonly used dictionary should be interpreted as having meanings consistent with their meanings in the context of related literatures and will not be interpreted as having ideal or excessively formal meanings unless explicitly defined in the present application.

Exemplary embodiments of the present disclosure will now be described in detail with reference to the accompanying drawings. In order to facilitate general understanding in describing the present disclosure, the same components in the drawings are denoted with the same reference signs, and repeated description thereof will be omitted.

FIG. 1 is a schematic diagram of a communication system according to an exemplary embodiment of the present disclosure. As shown in FIG. 1, a communication system 100 may include a plurality of communication nodes 110-1, 110-2, 110-3, 120-1, 120-2, 130-1, 130-2, 130-3, 130-4, 130-5, and 130-6. The plurality of communication nodes may support 4G communication protocol (e.g., long term evolution (LTE) and LTE-advanced (LTE-A)) or 5G communication protocol (e.g., new radio (NR)) specified in the 3rd generation partnership project (3GPP) standards.

For example, for the 4G and 5G communications, the plurality of communication nodes may support a code division multiple access (CDMA) based communication protocol, a wideband CDMA (WCDMA) based communication protocol, a time division multiple access (TDMA) based communication protocol, a frequency division multiple access (FDMA) based communication protocol, an orthogonal frequency division multiplexing (OFDM) based communication protocol, a filtered OFDM based communication protocol, a cyclic prefix OFDM (CP-OFDM) based communication protocol, a discrete Fourier transform spread OFDM (DFT-s-OFDM) based communication protocol, an orthogonal frequency division multiple access (OFDMA) based communication protocol, a single carrier FDMA (SC-FDMA) based communication protocol, a non-orthogonal multiple access (NOMA) based communication protocol, a generalized frequency division multiplexing (GFDM) based communication protocol, a filter bank multi-carrier (FBMC) based communication protocol, a universal filtered multi-carrier (UFMC) based communication protocol, a space division multiple access (SDMA) based communication protocol, or the like.

Each of the plurality of communication nodes 110-1, 110-2, 110-3, 120-1, 120-2, 130-1, 130-2, 130-3, 130-4, 130-5 and 130-6 constituting the communication system 100 may operate as a base station or a terminal. For example, the communication system 100 may include a plurality of base stations 110-1, 110-2, 110-3, 120-1, and 120-2, and a plurality of terminals 130-1 and 130-2, 130-3, 130-4, 130-5, and 130-6.

The communication system 100 including the base stations 110-1, 110-2, 110-3, 120-1, and 120-2 and the terminals 130-1, 130-2, 130-3, 130-4, 130-5, and 130-6 may be referred to as an 'access network'. Each of the first base station 110-1, the second base station 110-2, and the third base station 110-3 may form a macro cell, and each of the fourth base station 120-1 and the fifth base station 120-2 may form a small cell. The fourth base station 120-1, the third terminal 130-3, and the fourth terminal 130-4 may belong to a cell coverage of the first base station 110-1. Also, the second terminal 130-2, the fourth terminal 130-4, and the fifth terminal 130-5 may belong to a cell coverage of the second base station 110-2. Further, the fifth base station 120-2, the fourth terminal 130-4, the fifth terminal 130-5, and the sixth terminal 130-6 may belong to a cell coverage of the third base station 110-3. The first terminal 130-1 may belong to a cell coverage of the fourth base station 120-1, and the sixth terminal 130-6 may belong to a cell coverage of the fifth base station 120-2.

Meanwhile, the communication system 100 may further include a core network (not shown). When the communication system 100 supports the 4G communications, the core network may include a serving-gateway (S-GW), a packet data network (PDN) gateway (P-GW), a mobility management entity (MME), and the like. When the communication system 100 supports the 5G communications, the core network may include a user plane function (UPF), a session management function (SMF), an access and mobility management function (AMF), and the like.

Each of the plurality of base stations 110-1, 110-2, 110-3, 120-1, and 120-2 may be referred to as a Node-B, an evolved Node-B (eNB), a gNB, an ng-gNB, a base transceiver station (BTS), a radio base station, a radio transceiver, an access point, an access node, a road side unit (RSU), a radio remote head (RRH), a transmission point (TP), a transmission and reception point (TRP), a flexible (f)-TRP, or the like.

Each of the plurality of base stations 110-1, 110-2, 110-3, 120-1, and 120-2 may operate in the same frequency band or in different frequency bands. The plurality of base stations 110-1, 110-2, 110-3, 120-1, and 120-2 may be connected to each other via an ideal backhaul or a non-ideal backhaul, and exchange information with each other via the ideal or non-ideal backhaul. Also, each of the plurality of base stations 110-1, 110-2, 110-3, 120-1, and 120-2 may be connected to the core network through the ideal or non-ideal backhaul. Each of the plurality of base stations 110-1, 110-2, 110-3, 120-1, and 120-2 may transmit a signal received from the core network to serving terminal 130-1, 130-2, 130-3, 130-4, 130-5, or 130-6, and transmit a signal received from the serving terminal 130-1, 130-2, 130-3, 130-4, 130-5, or 130-6 to the core network.

Each of the plurality of terminals 130-1, 130-2, 130-3, 130-4, 130-5, and 130-6 may perform operations corresponding to the operations of the plurality of base stations 110-1, 110-2, 110-3, 120-1, and 120-2, and operations supported by the plurality of base stations 110-1, 110-2, 110-3, 120-1, and 120-2. Each of the plurality of terminals 130-1, 130-2, 130-3, 130-4, 130-5, and 130-6 may be referred to as a user equipment (UE), a terminal, an access terminal, a mobile terminal, a station, a subscriber station, a mobile station, a portable subscriber station, a node, a device, an Internet of things (IoT) device, a mounted apparatus (e.g., a mounted module/device/terminal), an on-board unit (OBU), or the like.

Meanwhile, at least some of the terminals may perform device-to-device communications (D2D) with each other through a sidelink under a control of a base station. For example, each of the base stations 110-1, 110-2, and 110-3 may control D2D communications between the fourth terminal 130-4 and the fifth terminal 130-5, so that the fourth terminal 130-4 and the fifth terminal 130-5 may perform the D2D communications under control of the second base station 110-2 and the third base station 110-3.

In the communication system 100 shown in FIG. 1, a node transmitting a signal (hereinafter, referred to as "signal transmitter device") may transmit a radio frequency (RF) signal having a certain signal attribute, and a node receiving the signal (hereinafter, referred to as "signal receiver device") may receive the RF signal having the certain signal attribute. In an exemplary embodiment, the RF signal transmitted by the signal transmitter device may have a frequency in a certain frequency band, in particular, a very narrow frequency band, and the signal receiver device may receive the RF signal in the frequency band. Alternatively, however, the RF signal transmitted by the signal transmitter device may have certain polarization characteristics. For example, the RF signal transmitted by the signal transmitter device may be a right-hand circular polarized (RHCP) signal.

Though a land mobile communication system is depicted in FIG. 1 as an exemplary application of the exemplary embodiment, the present disclosure is not limited thereto and is applicable to a satellite communication receiver, a radar, and any other types of wireless signal receivers. It is noted that the term "communication signal" used herein may refer to any wireless signal regardless of the type of the system.

Figure 2:
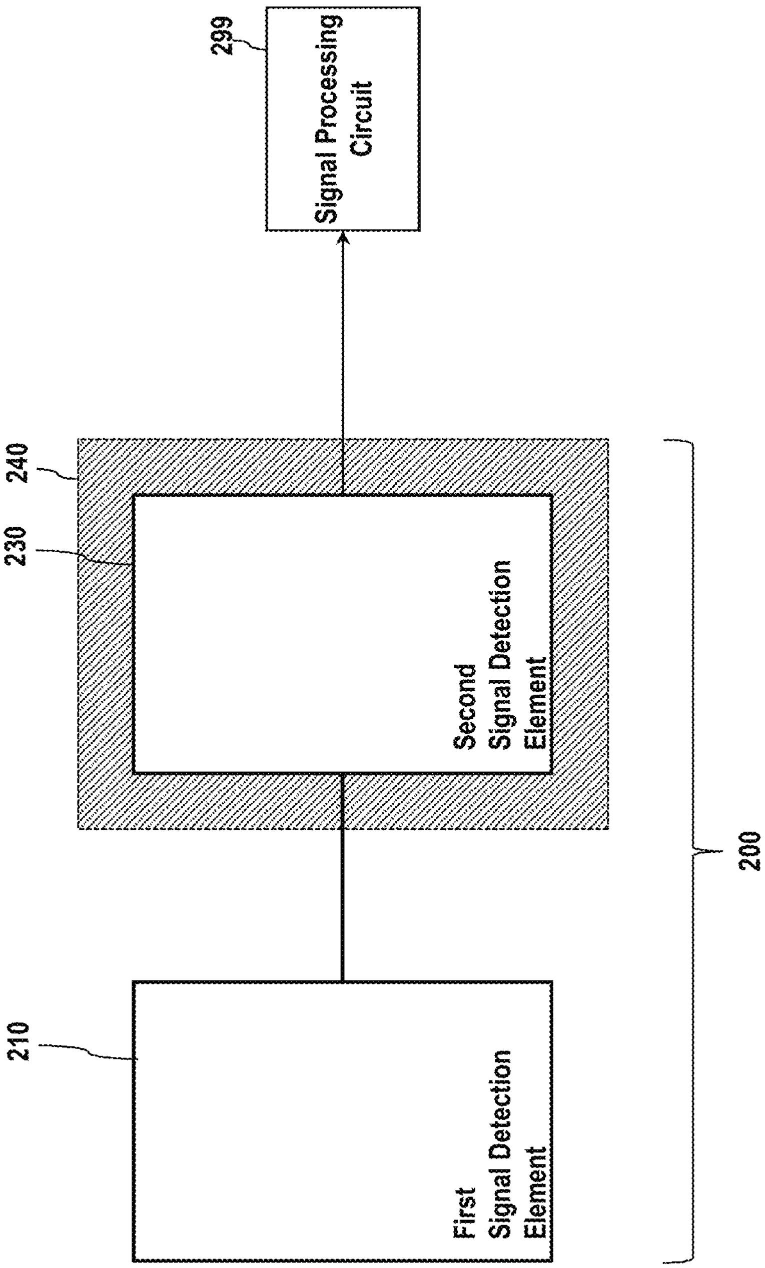
FIG. 2 is a block diagram of a signal receiver device according to an exemplary embodiment.
Figure 3:
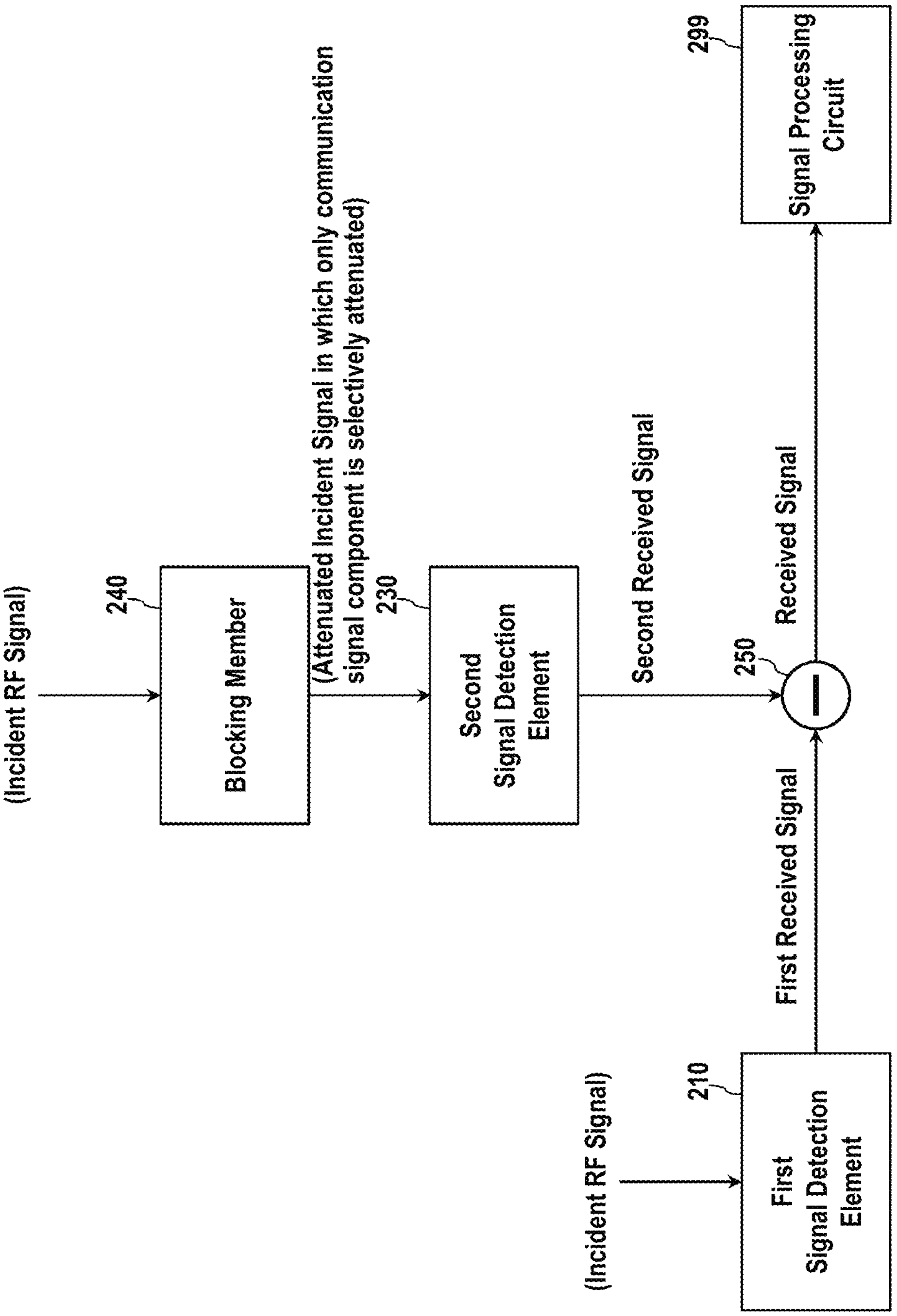
FIG. 3 is an equivalent circuit diagram of the signal receiver device according to an exemplary embodiment.

FIG. 2 is a block diagram of the signal receiver device according to an exemplary embodiment, and FIG. 3 is an equivalent circuit diagram of the signal receiver device according to an exemplary embodiment. The signal receiver device may include an antenna 200 and a signal processing circuit 299. The antenna 200 may detect the RF signal in an RF band or a millimeter wave band and output a detected received signal. The RF signal that may be detected by the antenna 200 may include an original communication signal (hereinafter, referred to as "communication signal") having propagated through a channel after being radiated by a signal transmitter device and a noise signal generated or introduced in a wireless channel environment. The signal processing circuit 299 may amplify a received signal and perform a demodulation and decoding of the received signal to reconstruct data included in the received signal. The antenna 200 may include a first signal detection element 210 and a second signal detection element 230 electrically connected to each other. The first signal detection element 210 and the second signal detection element 230 may be connected in series.

The first signal detection element 210 and the second signal detection element 230 may be implemented as a loop antenna, a dipole antenna, a horn antenna, or an antenna of another structure. The first signal detection element 210 and the second signal detection element 230 may have the same size and performance and have the same gain for an external signal, but may have a phase difference of 180 degrees from each other. Accordingly, detection signals of the first signal detection element 210 and the second signal detection element 230 may be combined and partially canceled, so that the antenna 200 may output a difference between the detection signals of the first signal detection element 210 and the second signal detection element 230 as the received signal to be supplied to the signal processing circuit 299. Although the derivation of the difference physically happens on a line or conductor of the antenna 200 including the first signal detection element 210 and the second signal detection element 230, the differential operation is modeled as being performed by a subtractor 250 in the equivalent circuit of FIG. 3.

A blocking member 240 for attenuating the communication signal among received RF signals is provided outside of either the first signal detection element 210 or the second signal detection element 230. The blocking member 240 may be provided on or over one of the first signal detection element 210 and the second signal detection element 230 but, for convenience of explanation, it is assumed that the blocking member 240 is provided on or over the second signal detection element 230. That is, among the two signal detection elements 210 and 230, one provided with the blocking member 240 is referred to as the second signal detection element 230 while the other one is referred to as the first signal detection element 210 in the present specification including the claims. In an exemplary embodiment, the blocking member 240 may include a coating layer formed on a surface of the second signal detection element 230. In another exemplary embodiment, the blocking member 240 may include a thick selective shielding body enclosing the second signal detection element 230. In another alternative embodiment, a container for accommodating the second signal detection element 230, e.g., a frame or housing, may be provided outside the second signal detection element 230, and the blocking member 240 may be implemented as a coating layer or a selective shielding structure formed on an exterior surface of the container.

The blocking member 240 significantly attenuates only the communication signal component excluding the noise signal component among the RF signals propagating toward the second signal detection element 230 so as to increase a difference in an intensity or power of detected communication signal components between the first signal detection element 210 and the second signal detection element 230. In an exemplary embodiment, the blocking member 240 may be a frequency selective surface (FSS) that attenuates the RF signal of a certain frequency band. For example, the blocking member 240 may attenuate signals in a frequency band in which the communication signal is transmitted and/or a neighboring frequency band so as to allow signals suppressed in the corresponding frequency band to be incident on the second signal detection element 230. Alternatively, however, the blocking member 240 may be a polarization selective surface (PSS) that attenuates a RF signal having a certain polarization. For example, the blocking member 240 may be a right-handed circular polarization selective surface (Right-Handed CPSS) attenuating and substantially blocking the communication signal component that may be a right-handed circular polarization (RHCP) signal while transmitting signals of different polarizations toward the second signal detection element 230 inside the blocking member 240. In addition, any device capable of significantly attenuating the communication signal component excluding the noise signal component among the RF signals within a small spatial range may be used for the blocking member 240.

Figure 4:
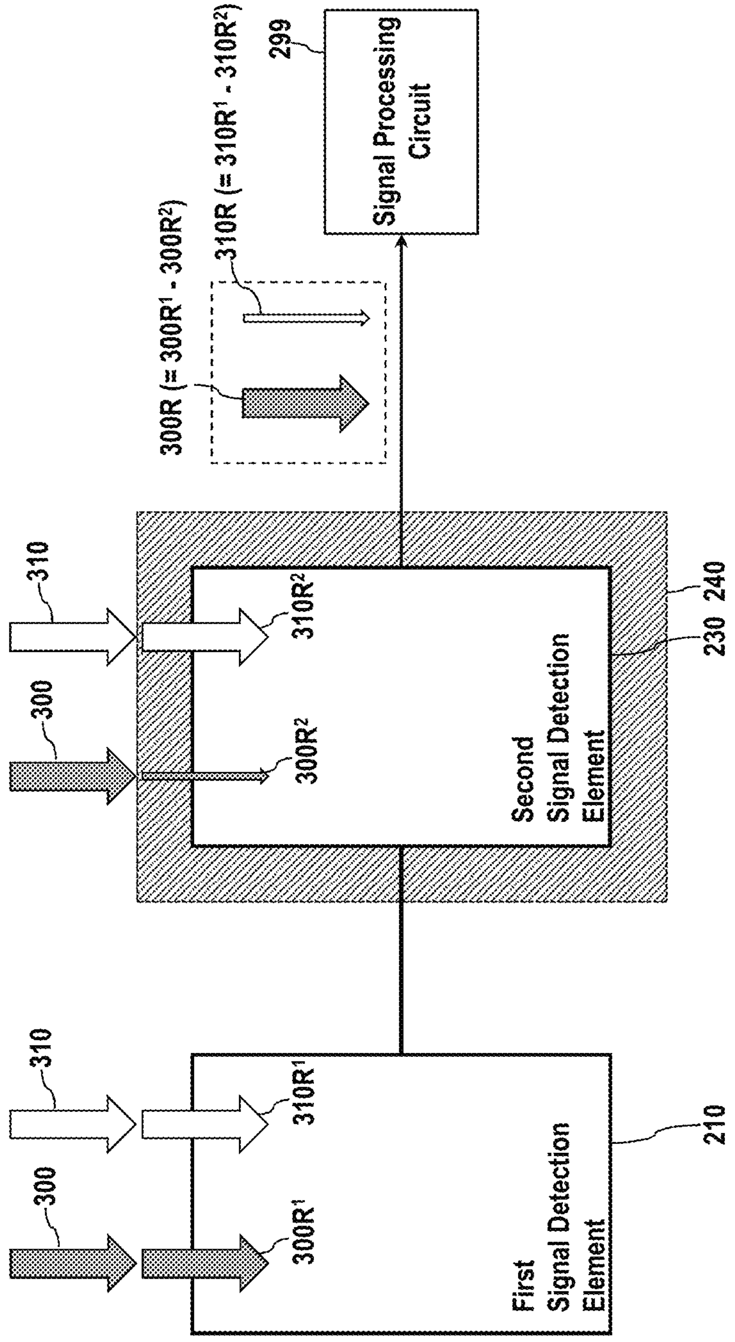
FIGS. 4 and 5 are illustrations for explaining an operation principle of the signal receiver device according to an exemplary embodiment.
Figure 5:
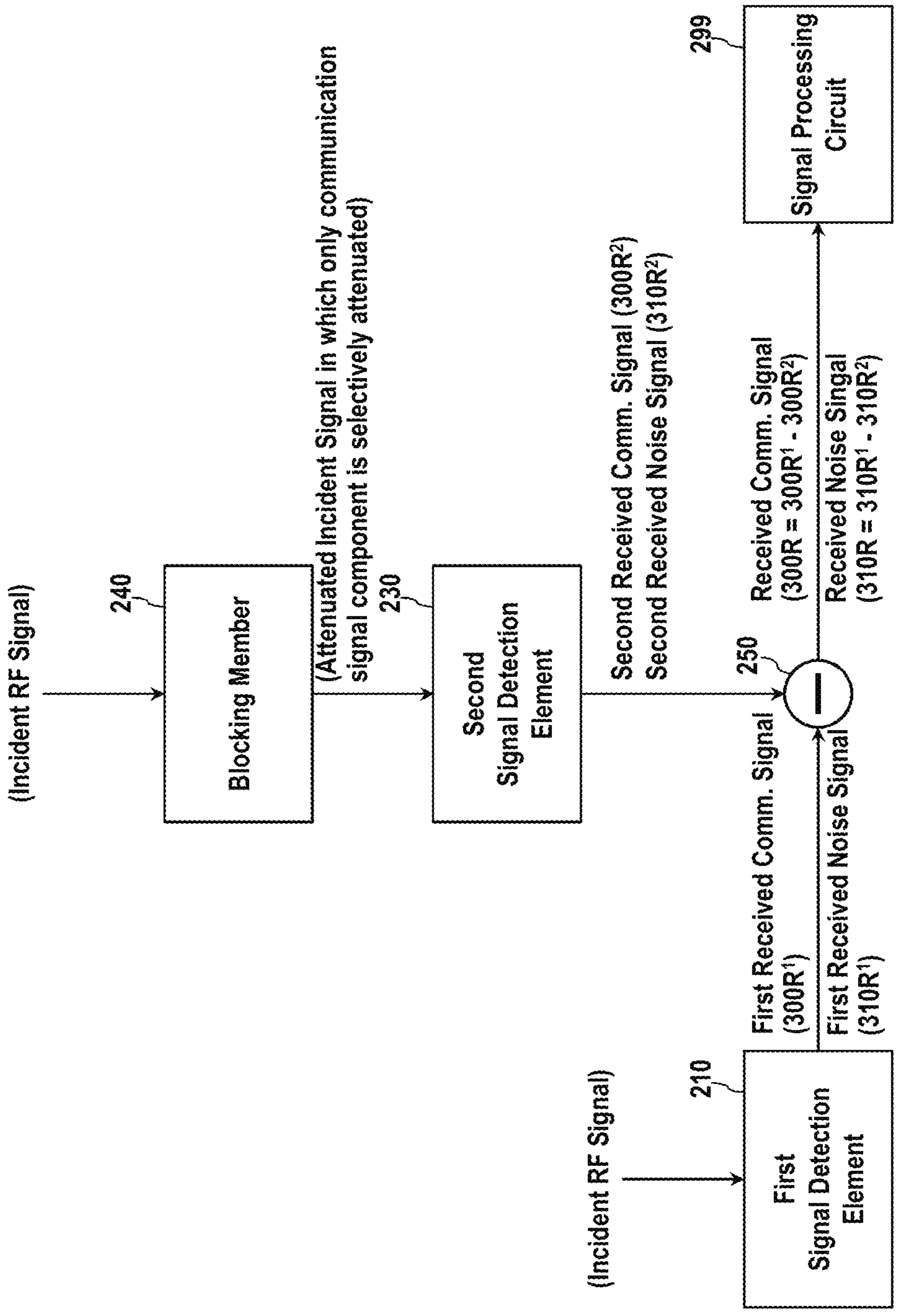

FIGS. 4 and 5 are illustrations for explaining an operation principle of the signal receiver device according to an exemplary embodiment. The RF signal including the communication signal 300 and the noise signal 310 may be incident on the first signal detection element 210 and the second signal detection element 230. It is assumed that the distance between the first signal detection element 210 and the second signal detection element 230 is sufficiently small, and the communication signal 300 and the noise signal 310 are incident on the elements with the same intensity or power.

The communication signal 300 coupled to the first signal detection element 210 is detected as an electrical received signal, i.e., a first received communication signal 300$R^1$ by the first signal detection element 210, and the noise signal 310 coupled to the first signal detection element 210 is detected as a first received noise signal 310$R^1$. Meanwhile, the blocking member 240 may selectively attenuate only the communication signal component among the incident RF signals. The communication signal 300 incident on a side of the second signal detection element 230 may be significantly attenuated by the blocking member 240 and then coupled to the second signal detection element 230, and then detected as a second received communication signal 300$R^2$ by the second signal detection element 230. Contrarily, the noise signal 310 incident on a side of the second signal detection element 230 is coupled to the second signal detection element 230 in an unattenuated state and detected as a second detected noise signal 310$R^2$ by the second signal detection element 230. The detected received signals 300$R^1$, 310$R^1$, 300$R^2$, and 310$R^2$ are combined and added, and an added signal is provided to the signal processing circuit 299 as the received signal.

At this time, since the first signal detection element 210 and the second signal detection element 230 have the same gain but a phase difference of 180 degrees, the first received noise signal 310$R^1$ and the second received noise signal 310$R^2$ are substantially cancelled out, and a received noise signal 310R which is a difference between the two signals may have a very weak intensity. Contrarily, since the second received communication signal 300$R^2$ is detected after a significant attenuation of the blocking member 240, a received communication signal 300R which is a difference between the first received communication signal 300$R^1$ and the second received communication signal 300$R2^2$ has an intensity similar to that of the first received communication signal 300$R^1$. Accordingly, in the received signal supplied to the signal processing circuit 299 by an output terminal of the antenna 200, i.e., the output terminal of the first signal detection element 210 and the second signal detection element 230, the communication signal component has an intensity similar to that of the signal incident to the antenna but the noise signal component remains with a very weak intensity. In other words, the cancellation of signals by the differential mechanism is effective only for the noise signal component while being ineffective for the communication signal component because there is a large difference in the intensity between the first received communication signal 300$R^1$ and the second received communication signal 300$R^2$ due to the attenuation of the communication signal component incident on the side of the second signal detection element 230 by the blocking member 240. Accordingly, most of the noise signal component may be removed while communication signal component is maintained, and the signal-to-noise ratio may be improved significantly.

Figure 6:
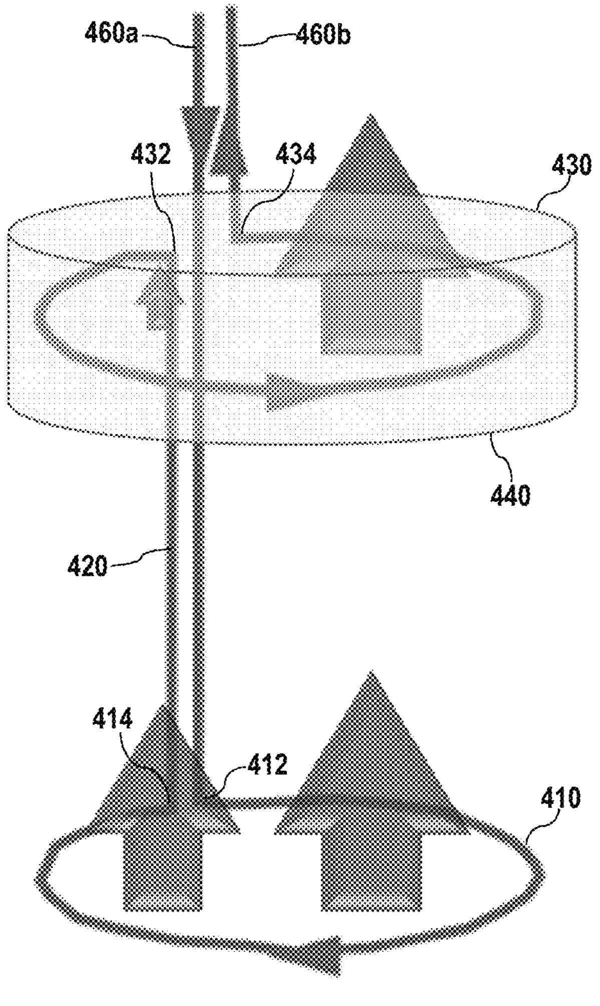
FIG. 6 is a perspective view of an antenna according to an exemplary embodiment of the present disclosure.

FIG. 6 is a perspective view of an antenna according to an exemplary embodiment of the present disclosure. The antenna according to the present embodiment includes a first signal detection portion 410 disposed at a bottom and having a winding wound in a first direction (e.g., clockwise when viewed downwards from the top) and a second signal detection portion 430 disposed above the first signal detection portion 410 and having a winding wound in a second direction (e.g., counterclockwise when viewed downwards from the top). That is, the first signal detection portion 410 and the second signal detection portion 430 may be implemented as a first and a second loop antennas, respectively, wound in opposite directions. A plane formed by the first loop antenna and another plane formed by the second loop antenna does not coincide but be parallel to each other, and a central axis of the first loop antenna may coincide with a central axis of the second loop antenna. A first end 412 of the first signal detection portion 410 where the winding of the first signal detection portion 410 starts and a second end 434 of the second signal detection portion 430 where the winding of the second signal detection portion 430 ends may be connected to a low noise amplifier, for example, of the signal processing circuit 299 through feeding lines 460A and 460B. A second end 414 of the first signal detection portion 410 where the winding of the first signal detection portion 410 ends and a first end 432 of the second signal detection portion 430 where the winding of the second signal detection portion 430 starts may be electrically connected to each other by a connecting portion 420.

In an exemplary embodiment, the first signal detection portion 410, the connecting portion 420, and the second signal detection portion 430 may be implemented using a single wire. Alternatively, however, a combination of the first signal detection portion 410, the connecting portion 420, and the second signal detection portion 430 may be implemented by two or more members electrically connected in series. The first signal detection portion 410 and the second signal detection portion 430 may have the same size and shape except for the winding direction of the wire. Even though each of the first signal detection portion 410 and the second signal detection portion 430 has the winding wound in a circular shape, the present disclosure is not limited thereto, and the wire may be wound in a rectangular, square, or other cross-sectional shape.

A blocking member 440 for attenuating the communication signal is provided outside the second signal detection portion 430. In an exemplary embodiment, the blocking member 440 may include a coating layer formed on a surface of the second signal detection portion 430. In another exemplary embodiment, the blocking member 440 may include a thick selective shielding body enclosing the second signal detection portion 430. In another alternative embodiment, a frame or housing, may be provided outside the second signal detection portion 430, and the blocking member 440 may be implemented as a coating layer or a selective shielding structure formed on an exterior surface of the frame or housing. The blocking member 440 significantly attenuates the communication signal component excluding the noise signal component among the RF signals propagating toward the second signal detection portion 430 so as to increase a difference in the intensity of detected communication signal components between the first signal detection portion 410 and the second signal detection portion 430. In an exemplary embodiment, the blocking member 440 may be a frequency selective surface (FSS) capable of attenuating the RF signal of the frequency band of the communication signal. In another exemplary embodiment, the blocking member 440 may be a polarization selective surface (PSS) capable of attenuating an RF signal having a certain polarization. In yet another embodiment, the blocking member 440 may include other kind of device capable of significantly attenuating the communication signal component excluding the noise signal component among the RF signals within a small spatial range.

Figure 7:
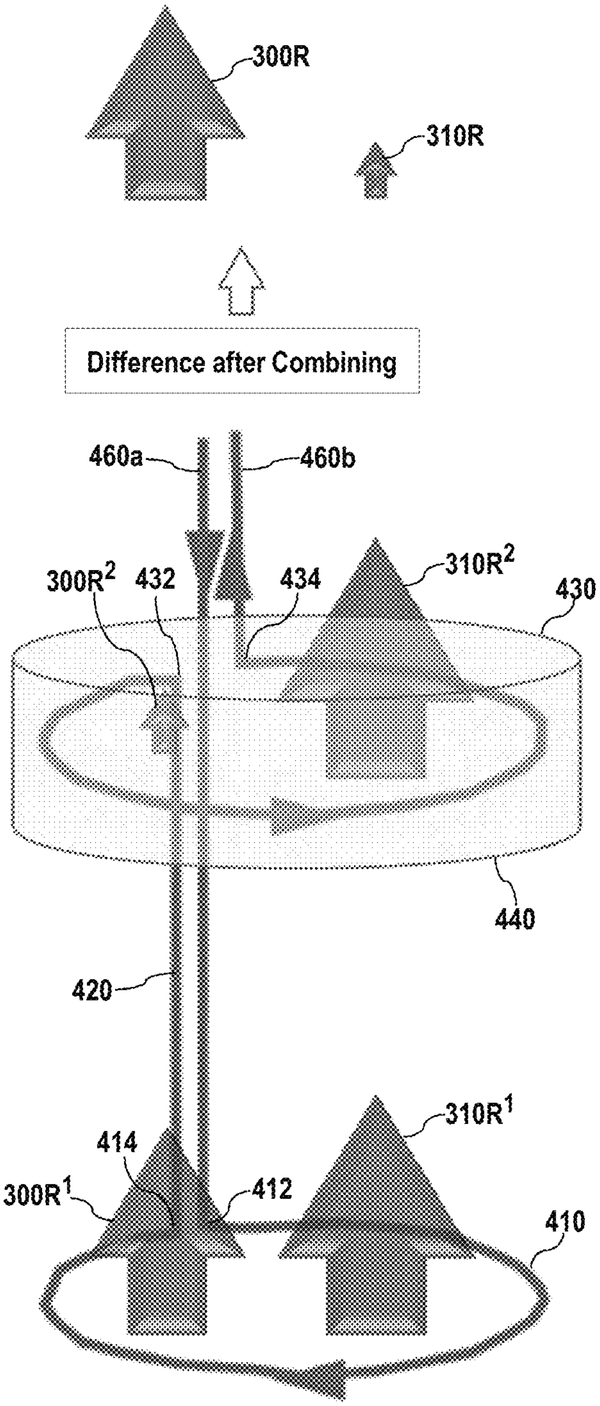
FIG. 7 is an illustration for explaining an operation principle of the antenna shown in FIG. 5.

FIG. 7 is an illustration for explaining an operation principle of the antenna shown in FIG. 6. The communication signal and the noise signal may be incident on the first signal detection portion 410 and the second signal detection portion 430. The distance between the first signal detection portion 410 and the second signal detection portion 430 is sufficiently small, and it may be assumed that each of the communication signal and the noise signal is incident on the first signal detection portion 410 and the second signal detection portion 430 with the same intensity. The communication signal and the noise signal incident on the first signal detection portion 410 may be coupled to the first signal detection portion 410 according to a gain of the first signal detection portion 410. Among the communication signal component and the noise signal component incident on the second signal detection portion 430, the communication signal component may be substantially attenuated by the blocking member 440 outside the second signal detection portion 430 while most of the noise signal component may transmit the blocking member 440. The noise signal component and the attenuated communication signal component may be coupled to the second signal detection portion 430 according to a gain of the second signal detection portion 430.

Accordingly, as depicted in the drawings, there is a large difference in the intensity between the first received communication signal 300$R^1$ coupled to and detected by the first signal detection portion 410 and the second received communication signal 300$R^2$ coupled to and detected by the second signal detection portion 430. In contrast, the first received noise signal 310$R^1$ coupled to and detected by the first signal detection portion 410 and the second received noise signal 310$R^2$ coupled to and detected by the second signal detection portion 430 may have the same or similar intensities. Due to the large difference in the intensity between the first received communication signal 300$R^1$ and the second received communication signal 300$R^2$, the amount of cancellation between the first received communication signal 300$R^1$ and the second received communication signal 300$R^2$ is insignificant, and the difference between the first received communication signal 300$R^1$ and the second received communication signal 300$R^2$ remains as the received communication signal. However, due to the cancellation of the first received noise signal 310$R^1$ and the second received noise signal 310$R^2$, the noise signal component may be removed or at least remains with very weak intensity.

To summarize, the communication signal is generated by the transmitter device to be distinguished from the noises by the frequency, the polarization, or another attribute, and only the communication signal component is attenuated by the blocking member 440, and then only the noise signal component is canceled by the differential method. As a result, the communication signal component 300R has an intensity similar to that of the signal incident to the antenna, but the noise signal component 310R remains very weak. Accordingly, the signal-to-noise ratio may be improved significantly.

FIGS. 8A through 11B illustrate examples of frequency spectra and temporal domain waveforms of various signals in an exemplary embodiment where the blocking member 330 attenuates the RF signals in the frequency band of the communication signal by use of the frequency selective surface (FSS) device.

Figure 8A:
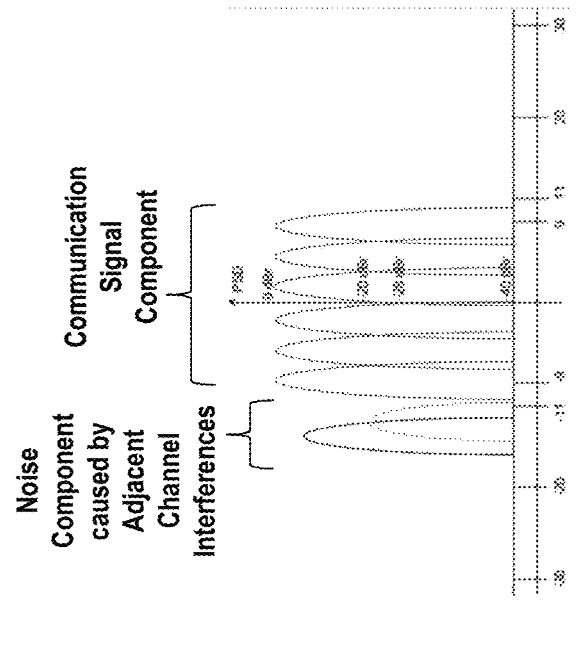
FIGS. 8A and 8B illustrate examples of frequency spectra and temporal domain waveforms, respectively, of signals incident on the antenna in an exemplary embodiment where signals in a frequency band of a communication signal is attenuated by use of a frequency selective surface (FSS) device.
Figure 8B:
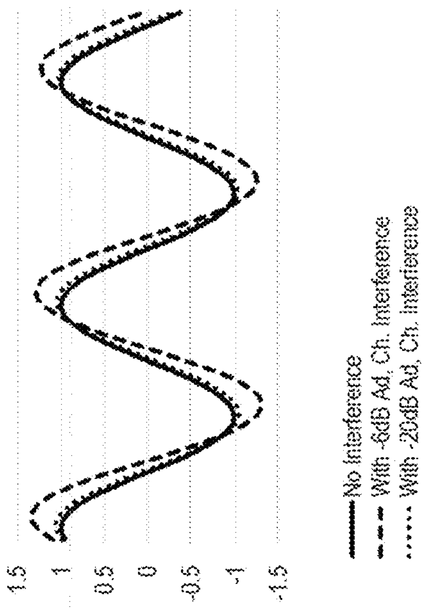

First, FIG. 8A shows the frequency spectrum of the RF signal incident on the antenna. As mentioned above, the RF signal includes the communication signal component having propagated through the channel after being radiated by a signal transmitter device. The communication signal component may include frequency components of at least one carrier or a plurality of subcarriers. In addition, the RF signal may include the noise signal component caused by adjacent channel interferences, for example. Since the out-of-band interference signals may affect the demodulation process of the original signal and deteriorate the signal-to-noise ratio, it is desirable to remove or suppress the noise signal component caused by the adjacent channel interferences. In particular, in the drawings and the following description, it is assumed that the noise signal component caused by the adjacent channel interferences includes an adjacent channel interferences of −6 dB and −20 dB. The temporal domain waveforms shown in FIG. 8B includes the communication signal component unrelated to the interferences, the adjacent channel interference component of −6 dB, and the adjacent channel interference component of −20 dB, and these components are incident on the antenna in a mixed and superposed state.

Figure 9A:
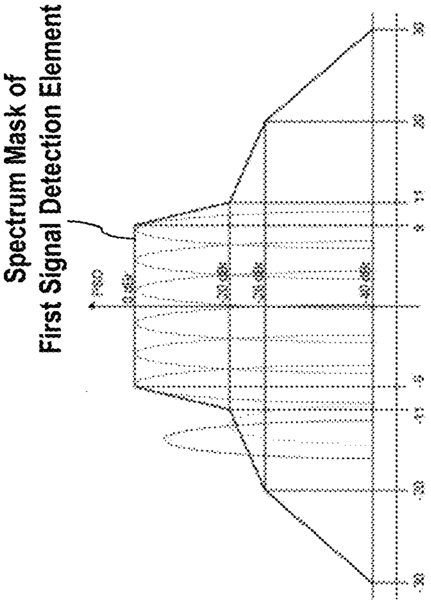
FIG. 9A illustrates a spectrum mask of a first signal detection element and a frequency spectrum of a first received signal output by the first signal detection element in an exemplary embodiment where the signals in the frequency band of the communication signal is attenuated by use of the FSS device.
Figure 9B:
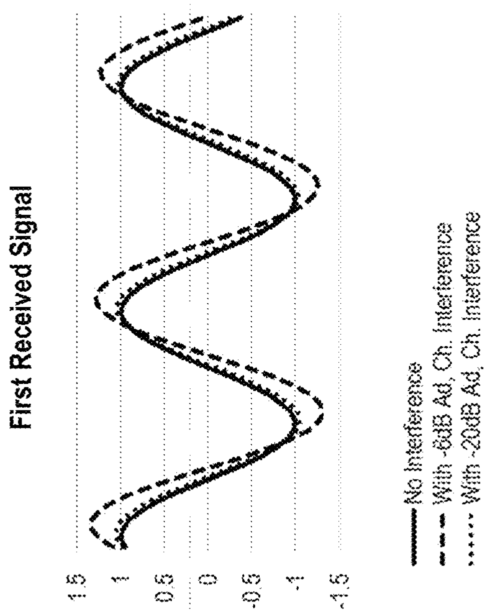
FIG. 9B illustrates temporal domain waveforms of components of the first received signal output by the first signal detection element in an exemplary embodiment where the signals in the frequency band of the communication signal is attenuated by use of the FSS device.

FIG. 9A illustrates a spectrum mask of the first signal detection portion 410 and a frequency spectrum of the first received signal output by the first signal detection portion 410. FIG. 9B illustrates temporal domain waveforms of the components of the first received signal output by the first signal detection portion 410. Assuming that the first signal detection portion 410 detects the RF signal with a very high reception gain over a sufficiently wide frequency band, the frequency spectrum and the temporal domain waveform of the first received signal are similar to the frequency spectrum and the temporal domain waveform of the RF signal incident on the antenna shown in FIGS. 8A and 8B.

Figure 10B:
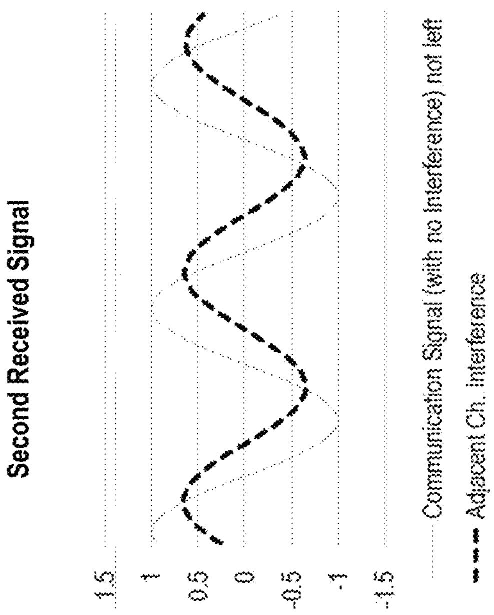
FIG. 10B illustrates temporal domain waveforms of components of the second received signal output by the second signal detection element in an exemplary embodiment where the signals in the frequency band of the communication signal is attenuated by use of the FSS device.
Figure 10A:
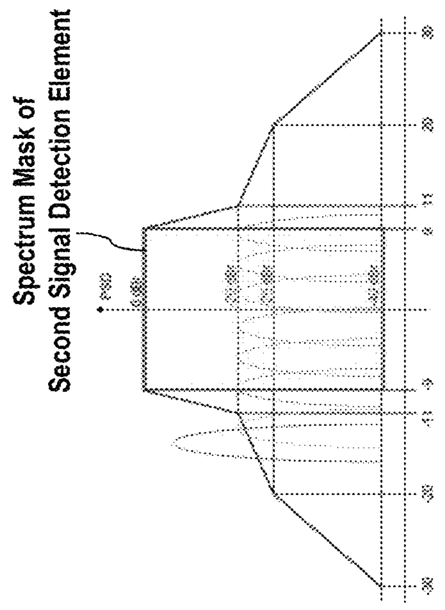
FIG. 10A illustrates a spectrum mask of a second signal detection element and a frequency spectrum of a second received signal output by the second signal detection element in an exemplary embodiment where the signals in the frequency band of the communication signal is attenuated by use of the FSS device.

FIG. 10A illustrates a spectrum mask of the second signal detection portion 430 and a frequency spectrum of the second received signal output by the second signal detection portion 430. FIG. 10B illustrates temporal domain waveforms of the components of the second received signal output by the second signal detection portion 430. Assuming the blocking member 440 sufficiently attenuates the communication signal in the frequency band of the communication signal and that the second signal detection portion 430 detects the RF signal with a very high reception gain over a sufficiently wide frequency band, the communication signal component in the second received signal may be greatly suppressed while the out-of-band noise component cased by the adjacent channel interferences may be maintained. Accordingly, the amplitude of the communication signal component in the temporal domain waveform may be reduced as shown in FIG. 10B. Though the noise signal components adjacent to a stop band of the blocking member 440 may also be attenuated slightly, it may be possible to design the spectrum characteristics of the blocking member 440 to affect little influence on the out-of-band adjacent channel interferences.

Figure 11B:
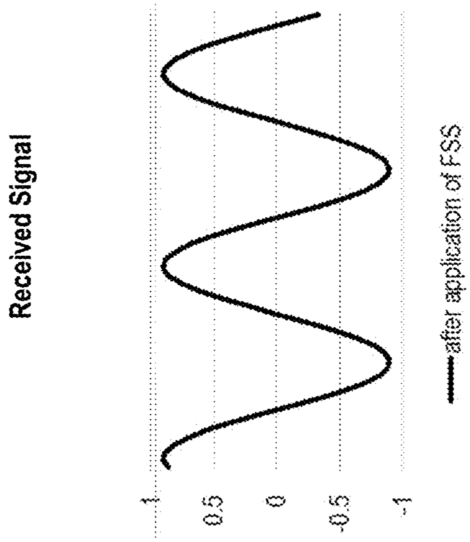
FIGS. 11A and 11B illustrate a frequency spectrum and a temporal domain waveform, respectively, of a received signal determined as a difference of the first received signal and the second received signal in an exemplary embodiment where the signals in the frequency band of the communication signal is attenuated by use of the FSS device.
Figure 11A:
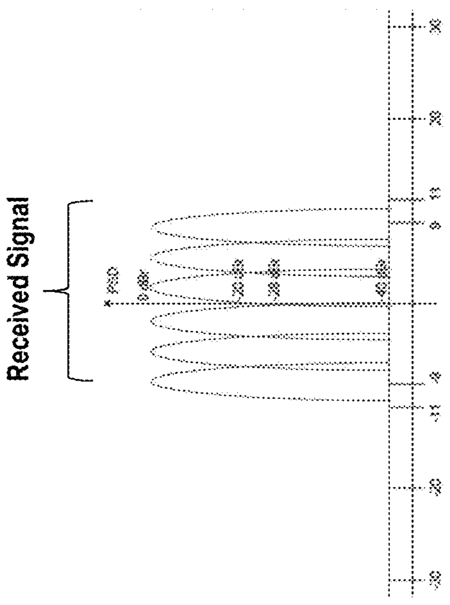

FIGS. 11A and 11B illustrate a frequency spectrum and a temporal domain waveform, respectively, of the received signal determined as a difference of the first received signal and the second received signal. The communication signal component having a significant difference in the intensity between the first received signal and the second received signal may be maintained in the final received signal, but the noise signal component having little difference in the intensity between the first received signal and the second received signal may be canceled out and be included in the final received signal with a negligible intensity.

Figure 12:
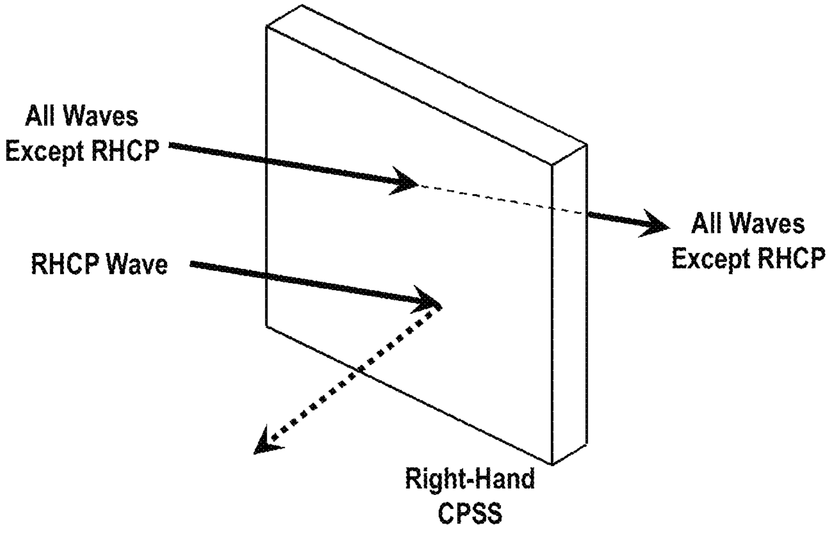
FIG. 12 illustrates an example of an operation principle of a polarization selective surface (PSS)

Meanwhile, as mentioned above, the blocking member 440 may be a polarization selective surface (PSS) that attenuates a RF signal having a certain polarization. FIG. 12 illustrates an example of an operation principle of a polarization selective surface (PSS). For example, the blocking member 440 may be a right-handed circular polarization selective surface (Right-Handed CPSS) attenuating and substantially blocking the communication signal component that may be a right-handed circular polarization (RHCP) signal while transmitting signals of different polarizations toward the second signal detection portion 430 inside the blocking member 440. Though a slab of an anisotropic medium is used as an example of a shape of the blocking member 440 for convenience of description in FIG. 12, the present disclosure is not limited thereto, and the blocking member 440 may be implemented by a coating layer or another shielding structure formed on the surface of a frame or housing accommodating the second signal detection portion 430, or another device. On the other hand, a size, quantity, and/or thickness of the first and second signal detection portions 410 and 430 in the drawings may be exaggerated to enhance understanding of the present disclosure by highlighting the characteristics of the devices, and may be implemented to have a different configuration actually.

Figure 13:
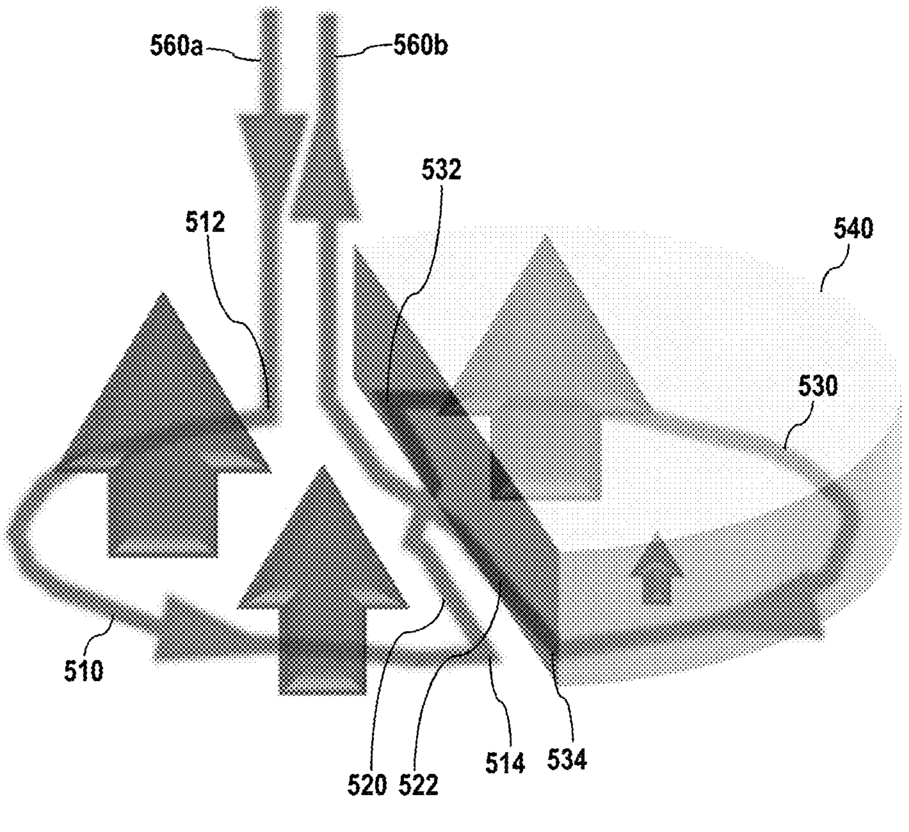
FIG. 13 is a perspective view an antenna according to another exemplary embodiment of the present disclosure.

FIG. 13 is a perspective view of an antenna according to another exemplary embodiment of the present disclosure. The antenna according to the present embodiment includes a first signal detection portion 510 having a winding wound in the first direction (e.g., clockwise when viewed downwards from the top) and a second signal detection portion 530 having a winding wound in the second direction (e.g., counterclockwise when viewed downwards from the top). In the present embodiment, the first signal detection portion 510 and the second signal detection portion 530 may be formed to be on the same plane. A first end 512 of the first signal detection portion 510 where the winding of the first signal detection portion 510 starts and a second end 534 of the second signal detection portion 530 where the winding of the second signal detection portion 530 ends may be connected to the low noise amplifier, for example, of the signal processing circuit 299 through feeding lines 560A and 560B. A second end 514 of the first signal detection portion 510 where the winding of the first signal detection portion 510 ends and a first end 532 of the second signal detection portion 530 where the winding of the second signal detection portion 530 starts may be electrically connected to each other by a first connecting portion 520. In order to maximize a symmetry between the first signal detection portion 510 and the second signal detection portion 530, the second end 534 of the second signal detection portion 530 and an end of the feeding line 560B may be connected to each other by a second connecting portion 522. The first connecting portion 520 and the second connecting portion 522 may be arranged to be twisted and cross each other. Thus, the antenna including the first signal detection portion 510 and the second signal detection portion 530 has a shape of a twisted loop.

In an exemplary embodiment, the first signal detection portion 510, the first connecting portion 520, the second signal detection portion 530, and the second connecting portion 522 may be implemented using a single wire. Alternatively, however, a combination of the first signal detection portion 510, the first connecting portion 520, the second signal detection portion 530, and the second connecting portion 522 may be implemented by two or more members electrically connected in series. The first signal detection portion 510 and the second signal detection portion 530 may have the same size and shape except for the winding direction of the wire. Even though each of the first signal detection portion 510 and the second signal detection portion 530 has the winding wound in an arc shape, the present disclosure is not limited thereto, and the wire may be wound in the rectangular, square, or other cross-sectional shape.

A blocking member 540 for attenuating the communication signal is provided outside the second signal detection portion 530. In an exemplary embodiment, the blocking member 540 may include a coating layer formed on a surface of the second signal detection portion 530. In another exemplary embodiment, the blocking member 540 may include a thick selective shielding body enclosing the second signal detection portion 530. In another alternative embodiment, a frame or housing, may be provided outside the second signal detection portion 530, and the blocking member 540 may be implemented as a coating layer or a selective shielding structure formed on an exterior surface of the frame or housing. The blocking member 540 significantly attenuates the communication signal component excluding the noise signal component among the RF signals propagating toward the second signal detection portion 530 so as to increase a difference in the intensity of detected communication signal components between the first signal detection portion 510 and the second signal detection portion 530. In an exemplary embodiment, the blocking member 540 may be a frequency selective surface (FSS) capable of attenuating the RF signal of a certain frequency band. In another exemplary embodiment, the blocking member 540 may be a polarization selective surface (PSS) capable of attenuating an RF signal having a certain polarization. In yet another embodiment, the blocking member 540 may include other kind of device capable of significantly attenuating the communication signal component excluding the noise signal component among the RF signals within a small spatial range.

Figure 14:
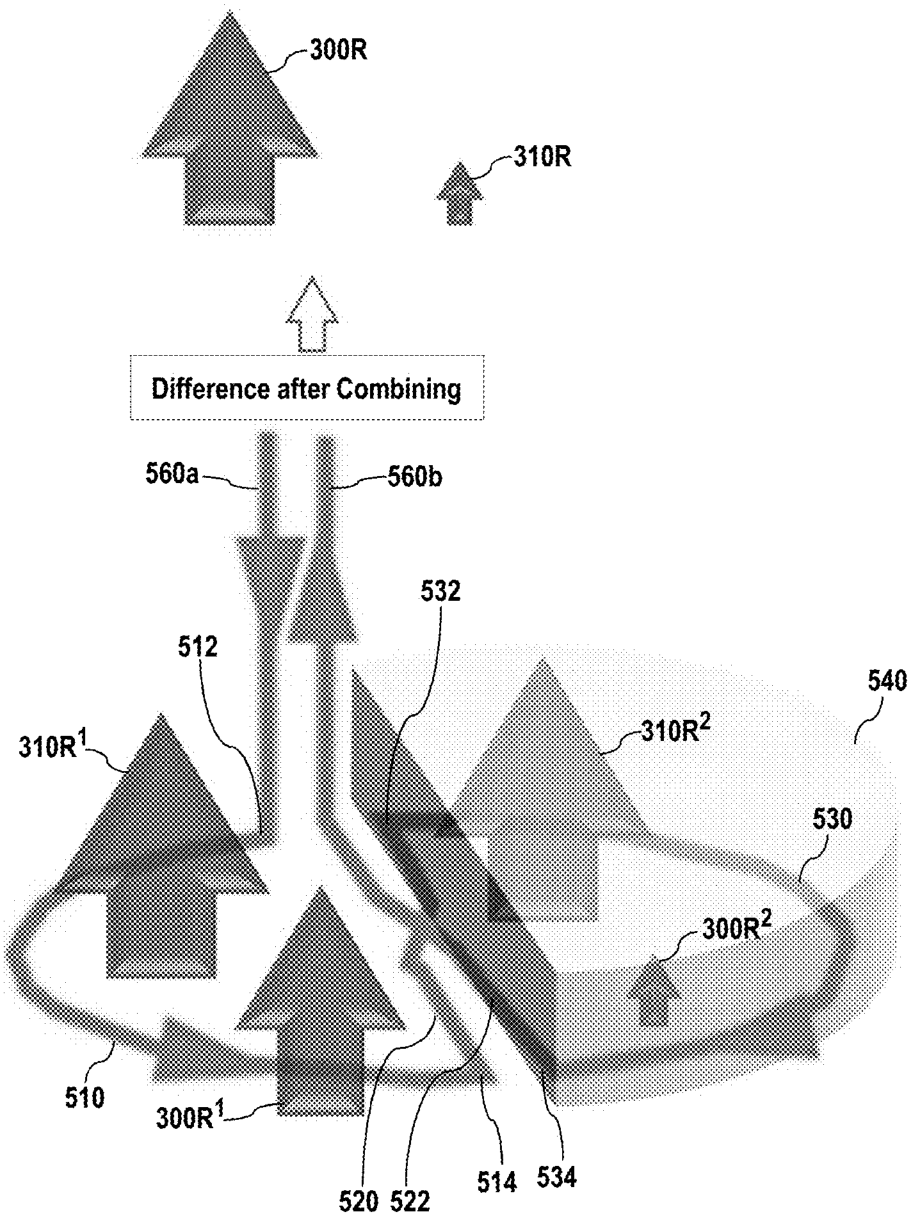
FIG. 14 is an illustration for explaining an operation principle of the antenna shown in FIG. 13.

FIG. 14 is an illustration for explaining an operation principle of the antenna shown in FIG. 13. The communication signal and the noise signal may be incident on the first signal detection portion 510 and the second signal detection portion 530. The distance between the first signal detection portion 510 and the second signal detection portion 530 is sufficiently small, and it may be assumed that each of the communication signal and the noise signal is incident on the first signal detection portion 510 and the second signal detection portion 530 with the same intensity. The communication signal and the noise signal incident on the first signal detection portion 510 may be coupled to the first signal detection portion 510 according to a gain of the first signal detection portion 510. Among the communication signal and the noise signal incident on the second signal detection portion 530, the communication signal may be substantially attenuated by the blocking member 540 outside the second signal detection portion 530 while the other signal components having an attribute such as the frequency or the polarization that is different from that of the communication signal transmit the blocking member 540. The noise signal and the attenuated communication signal may be coupled to the second signal detection portion 530 according to a gain of the second signal detection portion 530.

Accordingly, as depicted in the drawings, there is a large difference in the intensity between the first received communication signal 300$R^1$ coupled to and detected by the first signal detection portion 510 and the second received communication signal 300$R^2$ coupled to and detected by the second signal detection portion 530. In contrast, the first received noise signal 310$R^1$ coupled to and detected by the first signal detection portion 510 and the second received noise signal 310$R^2$ coupled to and detected by the second signal detection portion 530 have the same or similar intensities. Due to the large difference in the intensity between the first received communication signal 300$R^1$ and the second received communication signal 300$R^2$, the amount of cancellation between the first received communication signal 300$R^1$ and the second received communication signal 300$R^2$ is insignificant, and the difference between the first received communication signal 300$R^1$ and the second received communication signal 300$R^2$ remains as the received communication signal. However, due to the cancellation of the first received noise signal 310$R^1$ and the second received noise signal 310$R^2$, the noise signal component may be removed or at least remains with very weak intensity.

Figure 15:
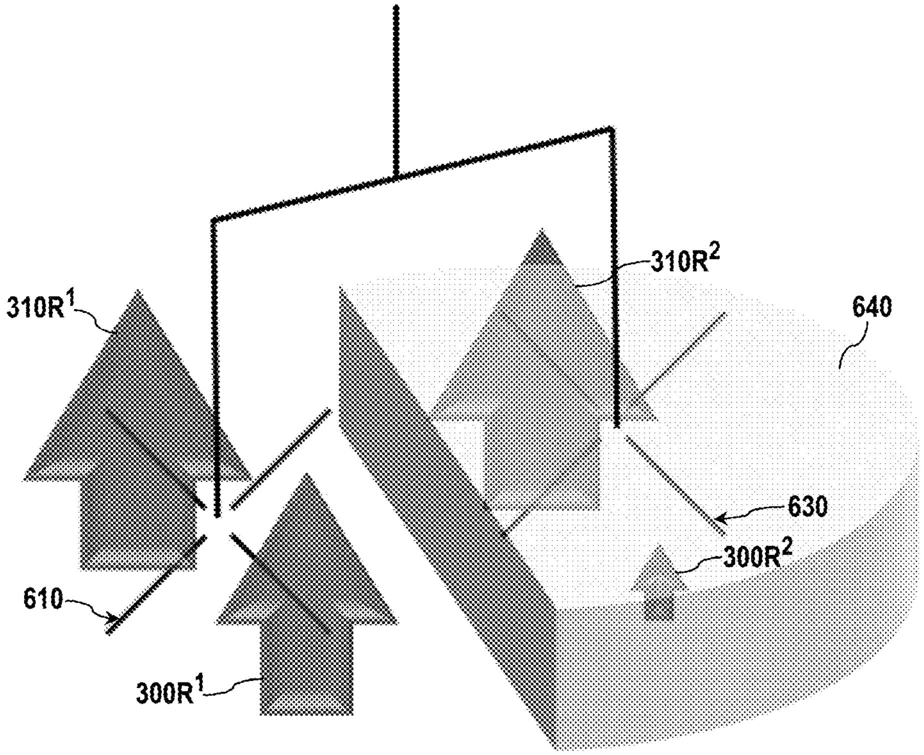
FIG. 15 is a perspective view of an antenna according to yet another exemplary embodiment of the present disclosure.

Although exemplary embodiments of the antenna using loop antenna elements have been described above, the approach of the present disclosure may also be applied to antennas including dipole antenna elements and other various antenna structures. FIG. 15 is a perspective view of an antenna according to yet another exemplary embodiment of the present disclosure. The antenna according to the embodiment of FIG. 15 may be a signal receiving antenna employing dipole-based antenna elements, and may be suitable for detecting a communication signal in a certain frequency band or having a certain polarization such as the RHCP, for example. The antenna according to the present embodiment may include a first signal detection unit 610, a second signal detection unit 630, and a blocking member 640 provided outside the second signal detection unit 630. As mentioned above, each of the first signal detection unit 610 and the second signal detection unit 630 may be implemented using a dipole antenna or a quadrapole antenna, or based on such antenna.

Figure 16:
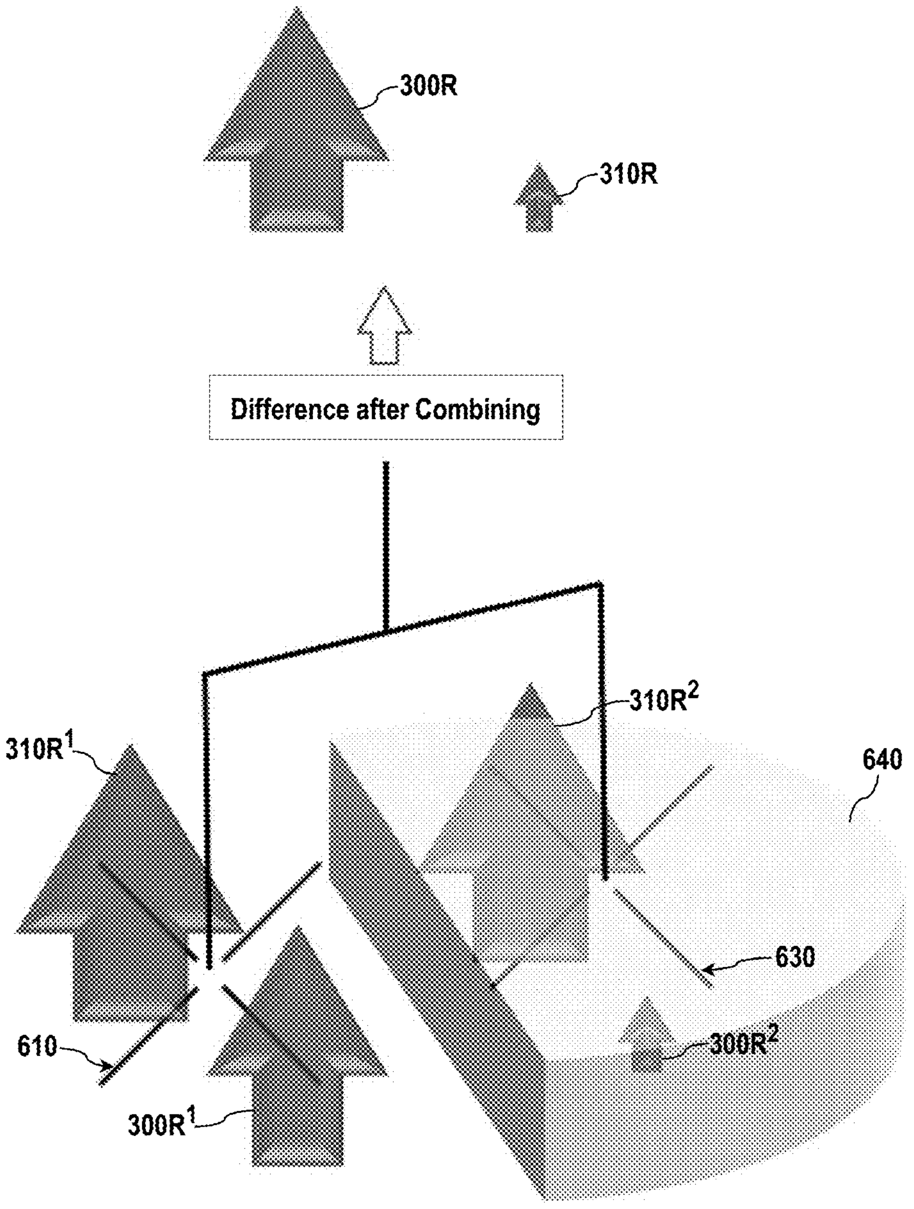
FIG. 16 is an illustration for explaining an operation principle of the antenna shown in FIG. 15.

FIG. 16 is an illustration for explaining an operation principle of the antenna shown in FIG. 15. The communication signal and the noise signal may be incident on the first signal detection unit 610 and the second signal detection unit 630. The distance between the first signal detection unit 610 and the second signal detection unit 630 is sufficiently small, and it may be assumed that each of the communication signal and the noise signal is incident on the first signal detection unit 610 and the second signal detection unit 630 with the same intensity. The communication signal and the noise signal incident on the first signal detection unit 610 may be coupled to the first signal detection unit 610 according to a gain of the first signal detection unit 610. Among the communication signal and the noise signal incident on the second signal detection unit 630, the communication signal may be substantially attenuated by the blocking member 640 outside the second signal detection unit 630 while the other signal having a different frequency or polarization from the communication signal transmit the blocking member 640. The noise signal and the attenuated communication signal may be coupled to the second signal detection unit 630 according to a gain of the second signal detection unit 630.

Accordingly, there is a large difference in the intensity between the first received communication signal 300$R^1$ coupled to and detected by the first signal detection unit 610 and the second received communication signal 300$R^2$ coupled to and detected by the second signal detection unit 630. In contrast, the first received noise signal 310$R^1$ coupled to and detected by the first signal detection unit 610 and the second received noise signal 310$R^2$ coupled to and detected by the second signal detection unit 630 have the same or similar intensities. Due to the large difference in the intensity between the first received communication signal 300$R^1$ and the second received communication signal 300$R^2$, the amount of cancellation between the first received communication signal 300$R^1$ and the second received communication signal 300$R^2$ is insignificant, and the difference between the first received communication signal 300$R^1$ and the second received communication signal 300$R^2$ remains as the received communication signal. However, due to the cancellation of the first received noise signal 310$R^1$ and the second received noise signal 310$R^2$, the noise signal component may be removed or at least remains with very weak intensity. Therefore, in the received signal output by the antenna, the communication signal component 300R has an intensity similar to that of the signal incident to the antenna but the noise signal component 310R remains very weak.

The description of the disclosure is merely exemplary in nature and, thus, variations that do not depart from the substance of the disclosure are intended to be within the scope of the disclosure. Such variations are not to be regarded as a departure from the spirit and scope of the disclosure. Thus, it will be understood by those of ordinary skill in the art that various changes in form and details may be made without departing from the spirit and scope as defined by the following claims.

What is claimed is:

1. An antenna detecting RF signals including a communication signal and a noise signal, comprising:
a first signal detection element; and
a second signal detection element electrically connected to the first signal detection element and provided with a blocking member including one or more of a frequency selective surface, a polarization selective surface, or a selective shielding structure, configured to selectively attenuate the communication signal relative to the noise signal among received RF signals,
wherein the antenna is configured to output a difference between a first detection signal detected by the first signal detection element and a second detection signal detected by the second signal detection element as a detected receive signal.

2. The antenna of claim 1, wherein the first signal detection element and the second signal detection element are connected in series such that the first detection signal and the second detection signal are cancelled at least partially.

3. The antenna of claim 2, wherein the first signal detection element and the second signal detection element are connected such that a direction of current according to a reception of the RF signal in the first signal detection element is opposite to the direction of current according to the reception of the RF signal in the second signal detection element.

4. The antenna of claim 3, wherein the first signal detection element and the second signal detection element include loop antennas wound in opposite directions.

5. The antenna of claim 4, wherein the first signal detection element comprises a first loop antenna wound in a first direction,
wherein the second signal detection element comprises a second loop antenna wound in a second direction opposite to the first direction.

6. The antenna of claim 5, wherein the first loop antenna and the second loop antenna are disposed such that a plane formed by the first loop antenna and a plane formed by the second loop antenna do not coincide but are parallel to each other.

7. The antenna of claim 6, wherein the first loop antenna and the second loop antenna are disposed such that a central axis of the first loop antenna coincides with a central axis of the second loop antenna.

8. The antenna of claim 6, wherein a second end of the first loop antenna where the winding of the first loop antenna ends and a first end of the second loop antenna where the winding of the second loop antenna starts are electrically connected to each other.

9. The antenna of claim 5, wherein the first loop antenna and the second loop antenna are disposed on a same plane.

10. The antenna of claim 9, further comprising:
a first connecting portion connecting a second end of the first signal detection portion where the first loop antenna ends and a first end of the second signal detection portion where the second loop antenna starts; and
a second connecting portion connecting a second end of the second signal detection portion where the second loop antenna ends to an end of a feeding line,
wherein the first connecting portion and the second connecting portion are arranged to be twisted and cross each other.

11. The antenna of claim 1, wherein the blocking member of the second signal detection element is a frequency selective surface (FSS) suitable for attenuating a signal of a same frequency as a frequency of the communication signal.

12. The antenna of claim 1, wherein the blocking member of the second signal detection element is a polarization selective surface (PSS) suitable for attenuating a signal having a same polarization as a polarization of the communication signal.

13. The antenna of claim 1, wherein the blocking member of the second signal detection element comprises a coating layer formed on a surface of the second signal detection element.

14. The antenna of claim 1, wherein the blocking member of the second signal detection element is provided on a surface of a frame accommodating the second signal detection element.

15. The antenna of claim 1, further comprising:
an amplifier for amplifying a difference between detection signals of the first signal detection element and the second signal detection element.

16. A signal receiver device, comprising:
an antenna for detecting an RF signal including a communication signal and a noise signal, and outputting a detected receive signal; and
a signal processing circuit amplifying the detected receive signal, and demodulating and decoding an amplified signal to reconstruct data included in the detected receive signal,
wherein the antenna comprises:
a first signal detection element; and
a second signal detection element electrically connected to the first signal detection element and provided with a blocking member including one or more of a frequency selective surface, a polarization selective surface, or a selective shielding structure, configured to selectively attenuate the communication signal relative to the noise signal among the RF signal,
wherein the signal receiver device is configured to output a difference between a first detection signal detected by the first signal detection element and a second detection signal detected by the second signal detection element as the detected receive signal.

17. The signal receiver device of claim 16, wherein the first signal detection element and the second signal detection element are connected in series such that the first detection signal and the second detection signal are cancelled at least partially.

18. The signal receiver device of claim 17, wherein the first signal detection element and the second signal detection element are connected such that a direction of current according to a reception of the RF signal in the first signal detection element is opposite to the direction of current according to the reception of the RF signal in the second signal detection element.

19. A wireless signal receiving method, comprising:
detecting an RF signal comprising a communication signal and a noise signal by a first detection element of an antenna to generate a first detection signal;
intentionally attenuating the communication signal relative to the noise signal among the RF signal based on an attribute of the communication signal and detecting an intentionally and selectively attenuated RF signal by a second detection element of the antenna to generate a second detection signal; and combining the first and second detection signals such that noise signal components included in the detection results are canceled to generate a receive signal including communication signal component.

20. The wireless signal receiving method of claim 19, wherein the first signal detection element and the second signal detection element have a same size and gain, but have a phase difference of 180 degrees from each other, wherein the first signal detection element and the second signal detection element are connected in series.

* * * * *